Sept. 22, 1970 C. A. BOOKER, JR., ET AL 3,530,437
MANIPULATION PAD WITH FERROMAGNETIC MATRIX ESPECIALLY ADAPTED FOR USE IN AN OBJECT RECOGNITION COMPUTER SYSTEM
Filed Dec. 5, 1966 3 Sheets-Sheet 1
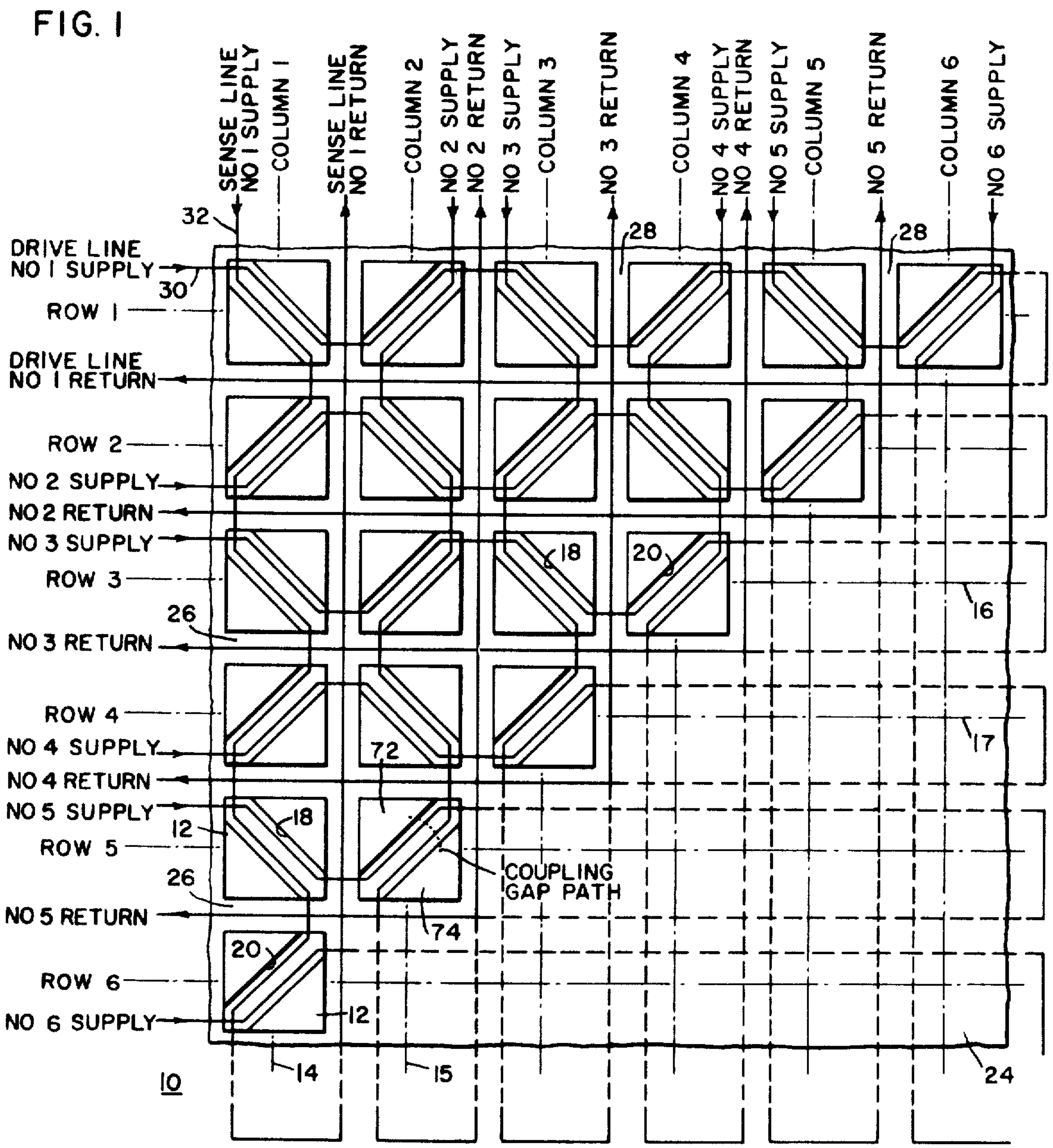
FIG. I
FIG. IA
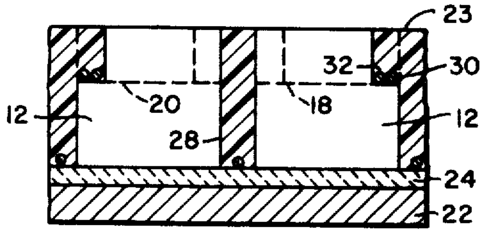
INVENTORS
Clyde A. Booker, Jr., John E. Lambright, Francis T. Thompson and Bruce R. Dow
BY E. F. Possesky
ATTORNEY MANIPULATION PAD WITH FERROMAGNETIC MATRIX ESPECIALLY ADAPTED FOR USE IN AN OBJECT RECOGNITION COMPUTER SYSTEM Filed Dec. 5, 1966 3 Sheets-Sheet 2

Sept. 22, 1970 C. A. BOOKER, JR., ET AL 3,530,437

MANIPULATION PAD WITH FERROMAGNETIC MATRIX ESPECIALLY ADAPTED FOR USE IN AN OBJECT RECOGNITION COMPUTER SYSTEM

Filed Dec. 5, 1966 3 Sheets-Sheet 3

United States Patent Office 3,530,437
Patented Sept. 22, 1970

3,530,437

MANIPULATION PAD WITH FERROMAGNETIC MATRIX ESPECIALLY ADAPTED FOR USE IN AN OBJECT RECOGNITION COMPUTER SYSTEM

Clyde A. Booker, Jr., Pittsburgh, John E. Lambright, Monroeville, Francis T. Thompson, Verona, and Bruce R. Dow, Murrysville, Pa., assignors to Westinghouse Electric Corporation, Pittsburgh, Pa., a corporation of Pennsylvania Filed Dec. 5, 1966, Ser. No. 599,031
Int. Cl. G11c *11/02;* G06k *9/00*
U.S. Cl. 340—172.5 20 Claims

ABSTRACT OF THE DISCLOSURE

Magnetic cores made from high permeability and high saturation flux density material are disposed in a pad with drive and sense wiring to form a ferromagnetic object recognition matrix. The pad generates digital output data and is operable in an educational or other digital computer system at drive pulse rates as high as 100 kHz. or more and with spatial resolution as great as 50 points or more per square inch. Recognition operation is highly discriminate against objects made from materials other than those similar to that used for the pad cores.

BACKGROUND OF THE INVENTION

The present invention relates to devices arranged to sense object shape, position and similar information and more particularly to ferromagnetic manipulation pads and objects recognition computer systems in which such pads are used.

A manipulation pad is a device which produces an electrical output representing recognition information concerning an object placed on the pad. Normally, it is desirable that the sensing surface of the pad be flat and smooth for convenient object manipulation.

A manipulation pad may for example be used in an object recognition computer system in which a manufacturing plant layout is simulated by means of objects placed on the pad and shaped and sized to model plant machinery and other items. The objects are manipulated to form different layouts, and the computer processes the pad outputs for the respective layouts and generates comparative output data on the basis of programmed layout evaluation rules.

Manipulation pads have significant utility in educational computer systems where the pads function as one of possibly several different types of input interfacing devices which enable the student to communicate with the computer. The specific operating purpose of the manipulation pad is to provide object recognition while the educational purpose of the system is to provide a learning environment for the student as he manipulates objects on the pad in accordance with the programmed instruction. For example, elementary geometry for young children might involve instruction in identification of various geometric figures. The computer would request a particular figure and in response the child would select an object and place it on the pad. The computer system quickly identifies the object shape and indicates whether the student's response was correct. Similarly, the programmed computer operated pad can be used for many other educational purposes involving the size, orientation and shape of objects or mathematical and other relationships among combinations of objects, etc.

In computer system and other applications such as in relatively simple cathode ray tube display systems, it is generally desirable that a manipulation pad be durable and economic. In educational computer systems, low pad cost is especially desirable in order that the total cost of all student stations may be held adequately low. Further, ease of pad usage is especially desirable so that little or no special student training is required.

With respect to electrical performance, the manipulation pad should be able to discriminate special manipulation objects from other objects particularly in educational applications where student belongings such as pencils and rulers are likely to be placed unwaringly on the pad. It should also be adapted to produce electrically with relatively high spatial resolution object recognition information from which the number, size, shape and orientation of objects on the pad can be determined.

In computer applications, it is especially desirable that the pad electrical output be in the form of digital signals directly usable by the computer in order to minimize the use of computer capacity in pad signal interpretation and processing. To take advantage of computer speed and to provide the necessary information in a reasonable time, the pad must be responsive to high frequency electrical operation.

SUMMARY OF THE INVENTION

It is thus one of the general objects of the present invention to provide a manipulation pad and an object recognition computer system which uniquely employ certain principles of operation and construction in an efficient and economic manner to achieve improved object recognition performance.

In accordance with the broad principles of the present invention, a manipulation pad comprises a structure economically and efficiently arranged to provide a ferromagnetic object recognition matrix. There are included a plurality of drive and sense circuits coupled in a predetermined manner to a plurality of magnetic core elements to form the matrix. The core elements are substantially isolated magnetically from each other and respectively provide substantial magnetic reluctance to magnetic coupling between the drive and sense circuits related thereto.

Drive circuitry preferably applies pulses sequentially to the drive circuits and a digitally usable voltage is induced in any particular sense circuit only when an object on the pad produces low magnetic reluctance in a magnetic path through the core element associated with the pulsed drive circuit and the particular sense circuit. Extremely high spatial resolution can be achieved with the matrix construction. Preferably, the magnetic core material has high magnetic permeability and high saturation flux density properties in order to provide highly sensitive and discriminatory recognition of objects of the same or a similar magnetic material.

In a computer system embodiment of the invention, a programmed digital computer controls the drive circuit operation and accepts input data from sense amplifier output circuitry coupled to the pad sense circuits. Extremely high frequency pad response enables efficient object recognition operation by the computer for educational or other system purposes.

Accordingly, another object of the invention is to provide a novel manipulation pad which employs ferromagnetic matrix techniques in economically and efficiently providing for high performance object recognition.

An additional object of the invention is to provide a novel manipulation pad which provides object recognition output information with improved resolution.

A further object of the invention is to provide a novel manipulation pad which is operable to generate an output representing high resolution recognition information from which the number, size, shape and orientation of objects on the pad can be determined.

It is another object of the invention to provide a novel manipulation pad which is highly discriminate in its object recognition operation and thus particularly suitable for usage in educational systems.

It is an additional object of the invention to provide a novel manipulation pad which employs high permeability and high saturation flux density magnetic core elements in generating with high sensitivity recognition information regarding objects made from the same or a similar magnetic material.

It is a further object of the invention to provide a novel manipulation pad which operates with high frequency response.

Another object of the invention is to provide a novel manipulation pad which is durably constructed and characterized with ease of use.

An additional object of the invention is to provide a novel object recognition computer system which is characterized with economic and efficient object recognition operation.

A further object of the invention is to provide a novel object recognition computer system which is especially adaptable for educational usage.

It is still another object of the invention to provide a novel object recognition computer system which is characterized with high frequency input interfacing circuit operation and rapid computer data input and processing for overall system efficiency.

A further object of the invention is to provide a novel object recognition computer system which includes a manipulation pad operating as an input interfacing device under computer control on the basis of ferromagnetic matrix principles to produce digital output data for computer processing with efficient computer capacity utilization.

These and other objects of the invention will become more apparent upon consideration of the following detailed description along with the attached drawings.

BRIEF DESCRIPTION OF THE DRAWINGS

FIG. 1 shows a partially schematic top plan view of a portion of a manipulation pad constructed in accordance with the principles of the invention.

FIG. 1A shows a side view of a portion of the manipulation pad shown in FIG. 1.

DESCRIPTION OF THE PREFERRED EMBODIMENT

Figure 2:
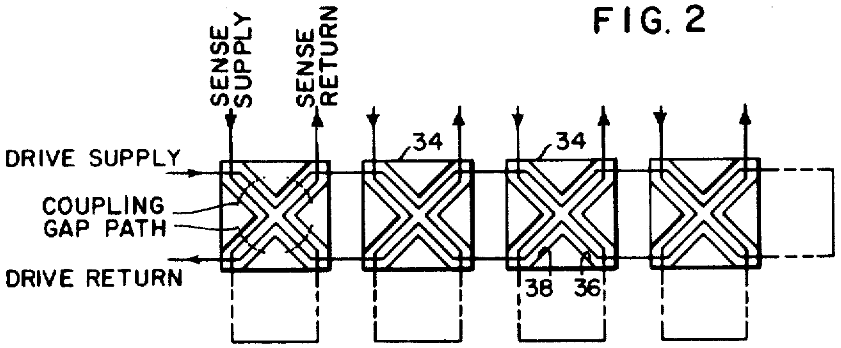
FIG. 2 shows a partially schematic top plan view of a portion of a manipulation pad including core elements arranged in accordance with an alternate embodiment of the invention.

More specifically, there is partially shown in FIG. 1 and FIG. 1A a manipulation pad 10 arranged and constructed to operate in accordance with the principles of the invention. It includes a plurality of magnetic core elements 12 formed from magnetic material and arranged to form a ferromagnetic object recognition matrix, in this instance in a two dimensional array.

Each core 12 forms a matrix point, with the total number of cores 12 in this case being one hundred eighty in a 10×18 point array. The number of matrix points per square inch directly affects the pad resolution, and the point density is thus normally desirably made as high as possible. For example, the distance between magnetic core center lines 14 and 15 or 16 and 17 in this case is equal to 0.141 inch so that a density of approximately 50 points per square inch is provided. This is near the maximum practical resolution limit. Another constructed pad has been characterized with a 72×64 point array with a point density of 36 points per square inch. Pads with different resolutions may be constructed from the same cores by using different spacings between the cores.

To provide the high operating sensitivity needed to achieve the high resolution made possible by the physical array, the cores 12 are preferably formed from a high permeability and high saturation flux density magnetic material such as Indiana General Corporation Type H which has a permeability of 4300 and a saturation flux density of 3400 gauss. The pad 10 also is then highly discriminatory in responding only to objects formed from the same or a similar magnetic material.

To form the pad 10, one or more presized blocks (not indicated) of the preselected magnetic material have a preground surface bonded by epoxy cement or other means to respective sheets of substantially non-magnetic material such as glass. The glass backed blocks are front slotted by a diamond cutting wheel or the like to produce a core separation slot width such as .02 inch with the predetermined spacing between the slots. The core separation slots are cut to a depth of .005 inch to .010 inch into the glass so as magnetically to isolate the cores 12 from each other and so as to provide generally square shaping therefor.

Diagonal sense and drive line wiring slots 18, 20 having a width such as .020 inch are made from the front side of each core 12 to a predetermined depth short of the glass-magnetic material interface. Each core 12 thus forms a low reluctance part of a magnetic circuit about its wiring slot, while the high reluctance gap across the slot proximate to the front flat surface of the core 12 completes the magnetic circuit about the slot. The diagonal direction of the wire slots 18 and 20 alternates from core to core in the core rows and columns in order to facilitate drive and sense line wiring.

All of the preformed blocks are combined to form the total pad array, and they are then bonded to a flat back support 22 (FIG. 1A) made from steel stock or the like. A glass layer 24 is thus formed by the assembled blocks and the cores 12 are arranged on the glass layer 24 in the predetermined array with the core isolation slots in the individual blocks aligned to form row slots 26 and column slots 28.

After drive and sense line wiring, epoxy potting compound or the like is vacuum impregnated into the pad slots 18, 20, 26 and 28 to fix the drive and sense wiring in place and to bond the pad structure into a strong solid unit. The pad 10 is then ground to remove excess epoxy and provide a flat work surface 23 preferably commonly including the front sides of the core elements 12 or if desired located just frontwardly thereof. If the selected magnetic material is available in the block size needed for the finished pad size, a single glass backed block can be used thereby eliminating the intermediate step of assembling multiple glass backed blocks. In either case, the finished pad product has a structure which is durable and capable of usage with little or no user training.

In the alternative, magnetic core elements are individually formed, such as by molding, and are bonded in the desired array to a single pad size back plate. Epoxy impregnation and work surface finishing steps again provide a durable and in this case a particularly economically constructed pad product. Thus, this manufacturing method is more suitable for mass production and further enables the core elements to be wire slotted in the geometry most suitable for wiring as will subsequently become more clear. In the machined embodiment of FIG. 1, the wire slots 18, 20 are made diagonally principally to enable wiring channels to be formed by straight passes of the cutter. When the cores are individually formed as by molding, the wire slot orientation and form can be made without this limitation.

When the pad 10 is to operate in a computer system, the number of points in each core row is preferably made a whole number multiple of the computer word length. In this manner, object recognition information is efficiently encoded in a digital form at the pad output thereby enabling efficient computer capacity usage in processing the data.

The following table schematically represents digital display information produced by a small manipulation pad having a 7×7 matrix for a seven bit computer word length.

| | Column | | | | | | | |
|---|---|---|---|---|---|---|---|---|
| | 1 | 2 | 3 | 4 | 5 | 6 | 7 | Row |
| Word: | | | | | | | | |
| First | 0 | 0 | 0 | 0 | 0 | 0 | 0 | 1 |
| Second | 0 | 0 | 0 | 1 | 1 | 0 | 0 | 2 |
| Third | 0 | 0 | 1 | 1 | 1 | 1 | 0 | 3 |
| Fourth | 0 | 0 | 1 | 1 | 1 | 1 | 1 | 4 |
| Fifth | 0 | 0 | 0 | 1 | 1 | 1 | 0 | 5 |
| Sixth | 0 | 0 | 0 | 0 | 0 | 0 | 0 | 6 |
| Seventh | 0 | 0 | 0 | 0 | 0 | 0 | 0 | 7 |

The 1 valued bits indicate an approximately square object having four points per side and located near the upper right-hand corner of the pad with an approximate 45° orientation. As previously indicated, resolution depends on core element density, and high resolution can be obtained for the pad schematically represented in the above table by increasing the number of core rows and the number of core columns to higher respective numbers while retaining the same pad work surface area.

With reference again to the pad 10 of FIG. 1, drive and sense circuits have respective supply lines 30 and 32 disposed in the core wire slots 18 and 20. The wiring for drive and sense supply and return lines is preferably in the form of insulated wire such as number 30 or number 36 AWG wire having .004 inch nylon insulation.

Since the drive and sense circuits must be electrically isolated, it is desirable to test the wiring for interline leakage prior to pad impregnation or other final assembly steps. Typically, successful wiring tests show interline resistance of about 10 megohms or greater.

Normally, after epoxy potting, the sense and drive supply lines 30 and 32 are located at or toward the bottom of the core wire slots 18 and 20 in order to assure good magnetic coupling with the core elements 12. Drive and sense return lines are arranged in the pad 10 in a predetermined manner to complete the drive and sense circuits as subsequently described more fully.

The particular pattern of wiring depends to some extent on the geometry of the individual core elements. In general, however, a ferromagnetic matrix is formed by providing one sense circuit per core column and one or more drive circuits per core row in correspondence to the number of computer words per row. A unique combination of a single drive circuit and a single sense circuit is thus associated with each core element.

The pad 10 of FIG. 1 is prearranged for use with a computer having an 18 bit word length, and ten drive circuits have respective drive supply lines 30 respectively wired in a zig-zag fashion through the ten rows of cores 12. The return line of each drive circuit preferably is located in the parallel row slots 26 adjacent to the supply line 30 of the same drive circuit in order to minimize circuit loop size and noise pickup. Similarly, one sense supply line is placed in each core column with sense return lines disposed in the parallel and adjacent column slots 28. If desired, drive and sense line return can be along (not indicated) the underside of the pad 10.

A circuit terminal board (not shown) can be mounter behind the back plate 22 for terminating drive and sense line circuitry and for mounting any input and output electronic components and circuits which may desirably be made a part of the pad unit. A suitable cover (not shown), can be placed over the back part of the pad 10 so that only the pad work surface 23 is exposed.

For pads having multiple computer word length rows such as the 72×64 point pad to which reference was previously made, a plural number of drive circuits are provided for each row. Each drive circuit is thus associated with a sub-grouping of core elements in the row with which it is associated. For example, in the 72×64 point pad, four drive circuits are associated with each core element row. The first drive circuit goes to the first 18 core elements, while the second drive circuit goes to the second 18 elements, etc.

Figure 2A:
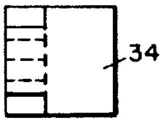
FIG. 2A shows a side view of one of the core elements shown in FIG. 2.
Figure 3:
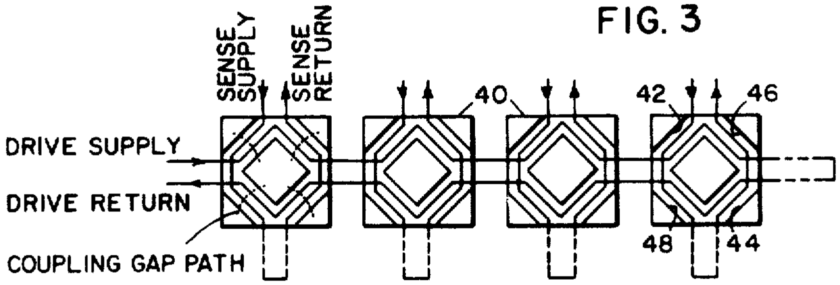
FIGS. 3, 3A and 4, 4A and 5, 5A and 6, 6A show respective additional manipulation pad embodiments in which respective additional alternate core constructions are employed in accordance with the principles of the invention.
Figure 3A:
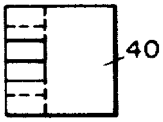

With the use of core element geometries other than that shown for the pad 10 in FIG. 1, additional wiring patterns can be achieved. For core element 34 shown in a row portion of another pad embodiment of the invention in FIGS. 2 and 2A, opposed diagonal slots 36 and 38 provide separate diagonal channels for active supply and active return drive lines and separate diagonal channels for active supply and active return sense lines. Similarly, in another pad embodiment of the invention in FIGS. 3 and 3A, core elements 40 have respective slots 42, 44 and 46, 48 formed in parallel with the element diagonal lines for placement of active supply and active return lines of the drive and sense circuits. Both core elements 34 and 40 can be individually formed or molded, or they can be machined to shape in a manner similar to that previously described.

Figure 4:
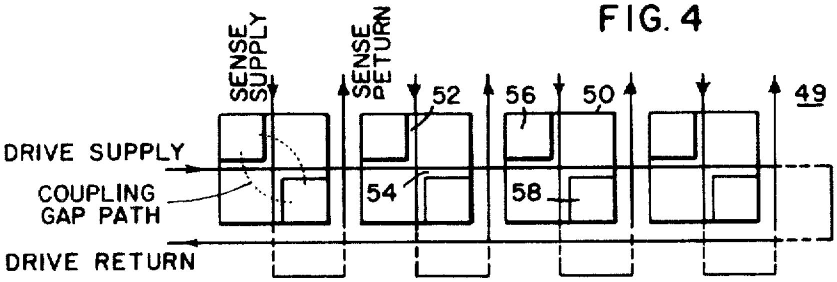
Figure 4A:
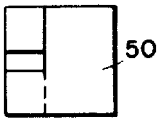
Figure 5:
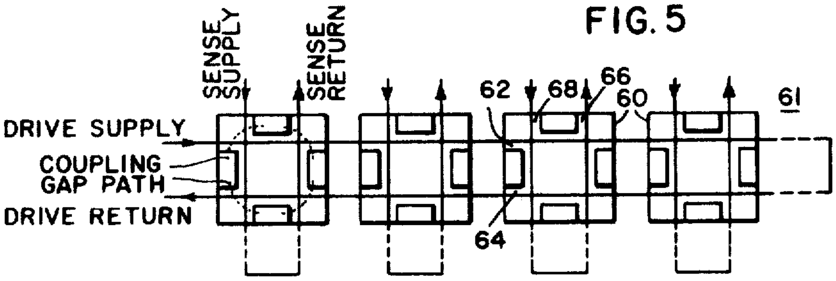
Figure 6:
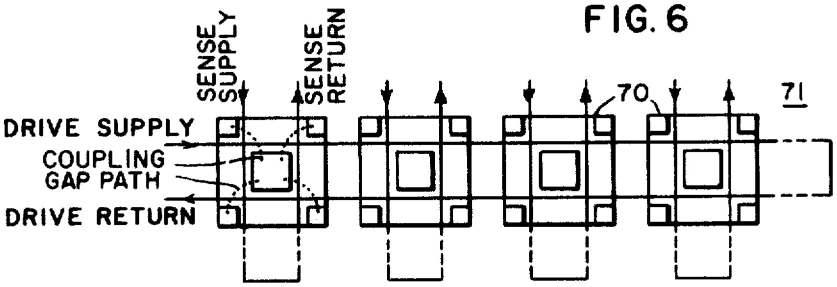

Particularly when small individually formed core elements are to be employed, it is preferred that one of the core geometries shown in manipulation pad row portions in FIGS. 4–6 be utilized since straight wiring can then be employed with substantial elimination of sharp and possibly damaging wire cornering required in the element geometries of FIGS. 4 and 4A. A pad 49 includes core elements 50 having perpendicularly related channels 52 and 54 in which straight drive and sense supply line wires are respectively located. The channels 52 and 54 are formed in part by core element corner posts 56 and 58, and if desired by additional posts (not shown) in the other two element corners. Inactive drive and sense return lies are straight wired in the adjacent row and column slots between the core elements 50.

Figure 5A:
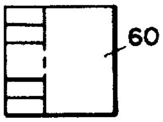
Figure 6A:
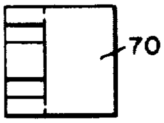

A core element 60 in a pad 61 shown in FIGS. 5 and 5A provides separate channels 62, 64 for straight active supply and straight active return drive wiring and separate channels 66 and 68 for straight active supply and straight active return sense wiring. Similar sets of channels are provided for straight wiring in another core element 70 in a pad 71 shown in FIGS. 6 and 6A.

Figure 7:
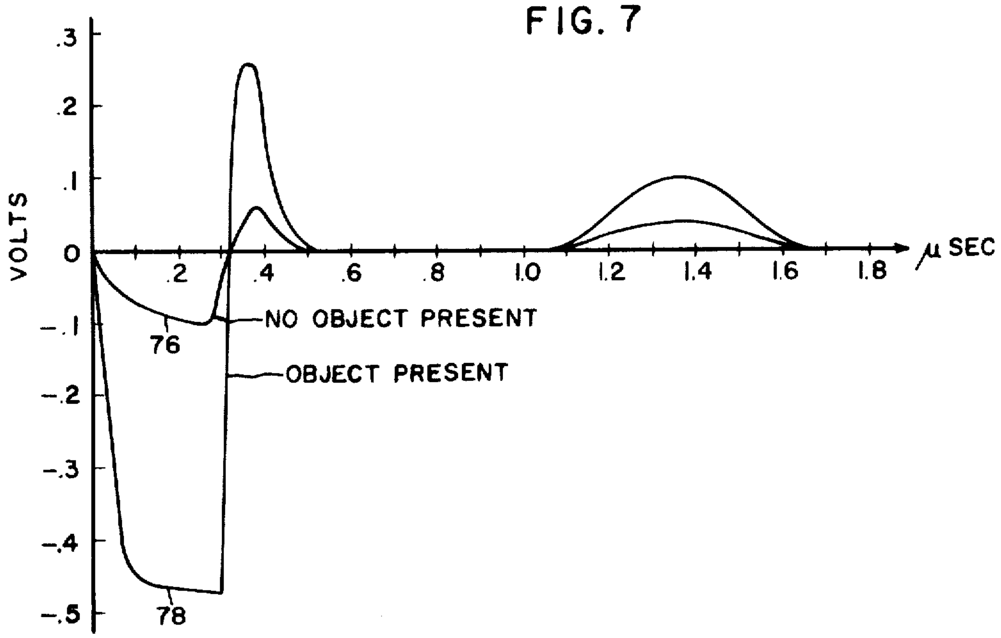
FIG. 7 shows typical voltage waveform outputs from a manipulation pad constructed in accordance with the principles of the invention.

In object recognition operation of the pad 10 or any of the other pad embodiments, each matrix point functions in a manner similar to a high reluctance transformer. The core element at each matrix point operates as a part of a magnetic circuit having a high reluctance gap between core ends 72 and 74 (FIG. 1) which are proximate to or located at the pad work surface 23. Essentially no signal coupling normally exists through a particular core 12 between its drive and sense lines. However, signal coupling is produced between the core associated drive and sense lines if the high reluctance core end gap is effectively bridged by a low reluctance magnetic object. As exemplary illustrated in FIG. 7, a drive line pulse produces only a negligible pulse 76 in the associated sense line with no bridging object present at the matrix point, while a sharp high level and readily detected magnetic object signal or pulse 78 is induced in the sense line with a bridging magnetic object present at the matrix point. With the use of high permeability and high saturation flux density magnetic material for the cores 12, high sensitivity and highly discriminate operation are provided since only objects made from the same or a similar material will produce the gap bridging function and will do so with a sharp transitional effect when the object reaches a critical position close to or at actual physical bridging. The magnetic material employed thus has an effect on resolution actually achieved.

The different geometries which can be employed for the core elements define different magnetic circuits having differently located and different numbers of bridgable gaps (as indicated by representative dotted coupling gap paths in the various core element figures). The core geometry thus also determines where and to what extent a magnetic object must overlie the core before effectively producing element bridging.

Figure 8:
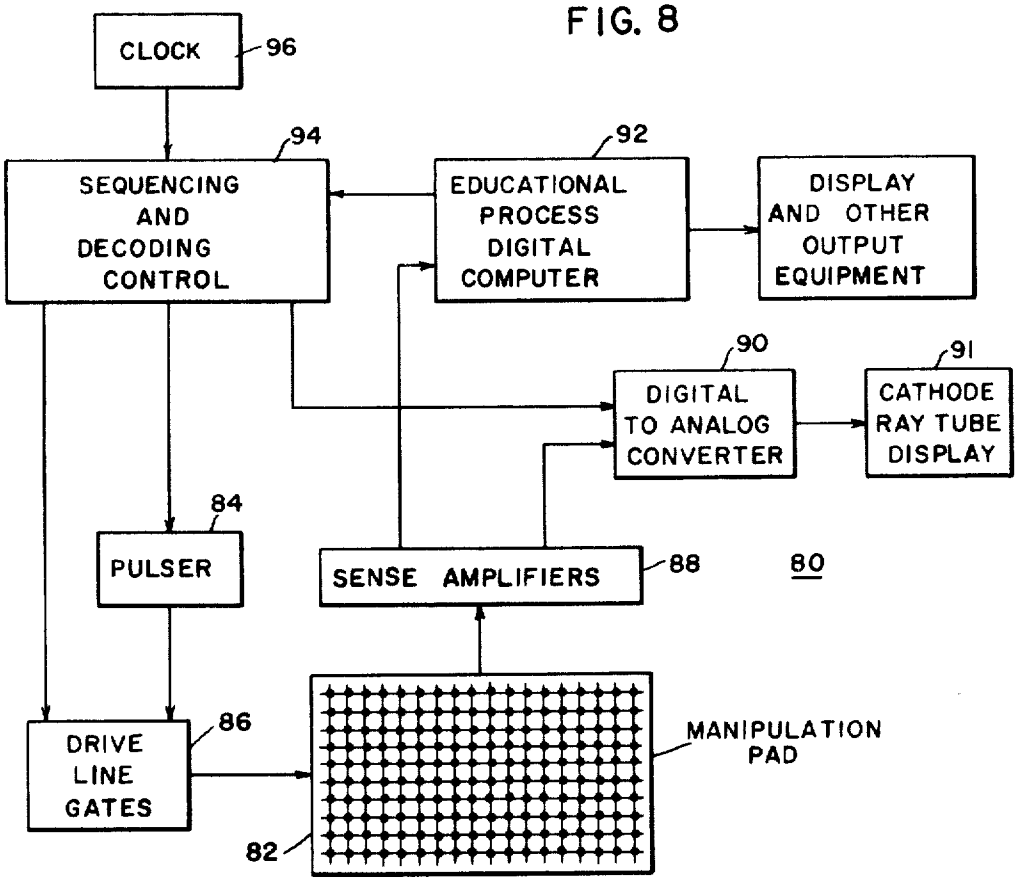
FIG. 8 shows an educational object recognition computer system arranged in accordance with the principles of the invention.

In a system embodiment of the invention shown in FIG. 8, an object recognition system 80 includes a manipulation pad 82 which is provided with the structure described in connection with FIG. 1. The 10×18 point array includes matrix points schematically represented by dots and drive and sense lines schematically represented respectively by horizontal and vertical lines.

Drive line pulsing is preferably executed sequentially and cyclicly. Thus, conventional pulser circuitry 84 generates pulses at a predetermined rate such as 100 kHz., and the pulses in turn are directed by conventional drive line gating circuits 86 to the pad drive lines in controlled or predetermined sequence. For example, the pulser circuitry 84 can be one or more transistor pulse drive circuits (not shown) each having one or more transformer outputs coupled through the gating circuitry 86 to the drive lines. The gating circuitry 86 can be conventional AC and DC solid state or monolithic switch circuits (not shown).

The fact that relatively high level object sense signals are generated by the sense lines of the pad 82 enables the sense output electronics to be provided with relatively simple amplifiers. Thus, in this case, each pad sense line, or a total of ten matrix points is coupled to a single conventional sense amplifier (not separately indicated) such as a single or multiple stage transistor amplifier circuit (not shown). Each sense amplifier generates an output signal at the time of drive pulsing only if a magnetic object signal is induced in its input sense line. Accordingly, sucessive parallel words of output data are developed by the sense amplifiers 88 as drive pulses are sequentially applied to the drive lines. In turn, a conventional digital-to-analog converter 90 can if desired be sequenced under suitable control through each sense amplifier output word to produce a video display on a cathode ray tube 92.

Typically, a cycle of operation would comprise application of drive pulses to the drive lines in sequence from the top to the bottom of the pad 82 (with direction reference to the drawing sheet). The ten output words developed sequentially in the sense amplifiers 88 thus provide a representation of magnetic objects located on the pad 82 and such representation is with high resolution for reasons previously indicated.

The system 80 is arranged to function in an educational capacity and for this purpose preferably includes a conventional digital process computer 92 programmed with educational material for student learning. Interfacing of the pad 82 with the computer 92 is made through the sense electronics.

One phase of the computer teaching operation includes operation of the manipulation pad 82 in response to computer instructions. The output from the sense amplifiers 88 is coupled to a computer input register (not indicated) and thus enables the computer 92 to evaluate whether the student has responded correctly to a preceding instruction. For example, the computer 92 might instruct the student to place a square object on the pad 82, and the pad 82 is then operated through one or more cycles to generate object recognition data for the computer 92. The computer 92 is programmed to recognize data representative of a square object and displays a correct indication if such data is obtained from the pad 82. Similarly, an incorrect indication is made by the computer 92 if data obtained from the pad 82 indicates placement of an incorrect object. Overall computer-pad system operation is fast and accurate, and the pad characteristics enable convenient student use with high resolution and highly discriminatory object recognition.

In order to control the pad operation, a sequencing and decoding control 94 operates the pulser circuitry 84 and the drive line gates 86. In this case, the digital to analog converter 90, which is used for cathode ray tube display is also controlled by the control 94. Conventional wired logic circuitry (not shown) formed from monolithic or other circuit elements is employed in the control 94 to drive the pulser 84 in response to the output from a clock 96 and to operate the drive line gates 86 for drive line sequencing.

The computer 92 has an output coupled to the sequenceing and decoding control 94 in order to provide address signals which define pad cycle starting and stopping. In some cases, the computer can also define the particular part of the pad cycle or scan for which object recognition data is required. In that event, only a part of the pad 82 is scanned one or more times.

After a sequence start signal is received from the computer 92, the sequencing and decoding control 94 causes the pad 82 to be scanned at a predetermined rate and in the sequence determined by wired logic for a predetermined number of cycles or until a stop signal is received from the computer 92. In other applications of the invention, the division between computer and wired logic control can be changed so that increased logic is performed in the computer 92 with corresponding changes made in the interfacing wired logic requirements.

Advantageously, the cyclic frequency at which drive pulses are applied to the pad 82 can be compatible with the memory cycle time of a typical computer with the use of core element magnetic material having the preferred properties. Thus, magnetic objects will provide drive and sense line coupling to produce sense signals at extremely high drive line operating frequencies. For example, with the use of core element material having preferred properties of high permeability and high saturation flux density, the drive pulse application rate to the drive lines can be as high as 100kHz. or more and excellent object recognition data is still generated by the sense amplifiers 88 at the output of the pad 82. In contrast, magnetic pad core elements made from steel or other common magnetic material result in essentially nonresponsive sense line operation at such high drive line operating frequencies.

In brief summary of the computer system embodiment, interaction between the computer interface electronics and the pad 82 at high frequencies provides for economic and efficient operation in the computer and in the overall system. Since the output from the sense amplifiers 88 is in digital form, relatively minimal computer capacity and computer programming is required for processing of the input data.

The foregoing description has been presented only to illustrate the principles of the invention. Accordingly, it is desired that the invention not be limited by the embodiments described, but, rather, that it be accorded an interpretation consistent with the scope and spirit of its broad principles.

What is claimed is:

1. A manipulation pad for generating recognition data related to a magnetic object locatable on a work surface of the pad, said pad comprising a plurality of magnetic elements substantially magnetically isolated from each other and arranged in a predetermined array, means for supporting said magnetic elements in said array, a plurality of drive circuits having supply and return lines and respectively located in association with first predetermined groupings of said magnetic elements a plurality of sense circuits having supply and return lines and respectively located in association with second predetermined groupings of said magnetic elements such that each of said magnetic elements is associated with a unique combination of a sense circuit and a drive circuit, means forming a part of each of said magnetic elements for providing a low reluctance part of a magnetic circuit about at least one of the lines of the associated drive circuit and at least one of the lines of the associated sense circuit, each of said magnetic elements having at least one high reluctance gap in the associated magnetic circuit and proximate to the pad work surface so as normally to prevent substantial signal coupling between the associated drive and sense circuits and so as to produce substantial signal coupling between the associated drive and sense circuits upon effective bridging of the gap by the magnetic object.

2. A manipulation pad as set forth in claim 1 wherein said magnetic elements are disposed in the array with a density equal to a value as great as 50 or more per square inch in correspondence to the desired spatial resolution.

3. A manipulation pad as set forth in claim 1 wherein each of said magnetic elements has a wire slot generally extending thereacross with a predetermined depth from a pad work surface facing side of the magnetic element, said magnetic elements are arranged in aligned and uniform relation in rows and columns to form said array, alternate magnetic elements have said wire slots extending in crossed directions diagonal to the array, and the associated circuited lines are located in said slot.

4. A manipulation pad as set forth in claim 1 wherein each of said magnetic elements has at least a pair of wire slots generally extending in crossed directions diagonal to the array and having a predetermined depth from a pad work surface facing side of the magnetic element, and the associated circuited lines are located in said slots.

5. A manipulation pad as set forth in claim 1 wherein each of said magnetic elements has at least a pair of wire channels generally extending respectively in row and column directions of said array with a predetermined depth from a pad work surface facing side of the magnetic element, and the associated circuited lines are located in said slots.

6. A manipulation pad as set forth in claim 5 wherein each of said magnetic elements is individually formed and said supporting means includes a support member on which said cores are disposed.

7. A manipulation pad as set forth in claim 1 wherein each of said magnetic elements has at least a first pair of wire channels generally extending in a row direction of said array and having a predetermined depth from a pad work surface facing the side of the magnetic elements, at least a second pair of wire channels generally extending in a column direction of said array and having a predetermined depth from a pad work surface facing side of the magnetic element, said drive circuits having supply and return lines respectively disposed in the wire channels of one of said channel pairs in said magnetic elements and said sense circuits having supply and return lines respectively disposed in the wire channels of the other of said channel pairs in said magnetic elements.

8. A manipulation pad as set forth in claim 1 wherein each of said magnetic elements is formed from a first magnetic material characterized with sufficiently high permeability and saturation flux density properties to enable signal coupling between the drive and sense lines only when effective gap bridging is produced by a magnetic object formed from a magnetic material having permeability and saturation flux density properties substantially like those of said first magnetic material.

9. A manipulation pad as set forth in claim 1 wherein the lines of said drive circuits and said sense circuits are formed by insulated wire, each of said magnetic elements is provided with at least one wire slot having at least one of said drive lines and at least one of said sense lines disposed therein and having a predetermined depth from a pad work surface facing side of the magnetic element, said supporting means includes a layer of substantially non-magnetic material having a surface to which said magnetic elements are bonded, rows of magnetic element isolating slots and columns of magnetic element isolating slots are located from the pad work surface facing side of said magnetic elements to the depth of the bonding surface of said non-magnetic layer and between said magnetic elements in said array, and means are disposed in said isolation slots and said wire slots for structurally unitizing said pad.

10. A manipulation pad as set forth in claim 9 wherein a back plate is provided and said non-magnetic layer is secured thereto, said structural unitizing means extends frontwardly to form at least a substantial part of said work surface, and said work surface is substantially flat.

11. A manipulation pad as set forth in claim 9 wherein said drive and sense circuits have supply lines disposed in said magnetic element wire slots and return lines disposed in said isolation slots.

12. A manipulation pad as set forth in claim 1 wherein means are provided for applying drive pulses to said drive circuits and means are provided for amplifying induced magnetic object signals in said sense circuits.

13. A manipulation pad as set forth in claim 12 wherein said drive pulse means applies drive pulse sequentially to said drive circuits and said sensing means includes a sense amplifier for each sense circuit.

14. An object recognition system comprising a manipulation pad having an array of magnetic elements, a plurality of drive circuits and sense circuits each having supply and return lines, at least one set of said lines disposed in coupling relation with said magnetic elements to form a ferromagnetic matrix, means forming a part of each of said magnetic elements for providing a low reluctance part of a magnetic circuit about the associated and coupled drive and sense lines, said pad having a work surface located over said magnetic elements, each of said magnetic elements having at least one high reluctance gap in the associated magnetic circuit and proximate to said pad work surface so as normally to prevent substantial signal coupling between the associated drive and sense circuits and so as to produce substantial signal coupling between the associated drive and sense circuits upon effective bridging of the gap by the magnetic object, means for sequentially applying drive pulses to said drive circuits, means for amplifying induced signals in said sense circuits, means for controlling said drive pulse applying means, and means for utilizing the output of said amplifying means.

15. An object recognition system as set forth in claim 14 wherein said object recognition system is a computer object recognition system including a programmed digital computer, said computer functions as part of said controlling means in controlling said drive pulse applying means, and said computer has an input coupled to said amplifying means to function as at least a part of said utilizing means.

16. An object recognition system as set forth in claim 14 wherein said system is a part of an educational system including an educational programmed digital computer, said computer functions as part of said controlling means in controlling said drive pulse applying means, said computer has an input coupled to said amplifying means to function as at least a part of said utilizing means, and said magnetic elements are formed from material having permeability and saturation flux density properties sufficiently high to result in detection only of objects made from magnetic material having substantially similar permeability and saturation flux density properties.

17. A computer object recognition system as set forth in claim 15 wherein said pad magnetic elements are disposed in the array with a density equal to a value as great as 50 or more per square inch in correspondence to the desired spatial resolution.

18. An object recognition computer system as set forth in claim 15 wherein said amplifying means includes a sense amplifier for each sense circuit and the number of said sense amplifiers equal to a whole number multiple of the number of bits which characterize the computer word length.

19. An object recognition computer system as set forth in claim 18 wherein said magnetic elements are formed from a magnetic material having permeability and saturation flux density properties sufficient to enable pad scan operation of frequencies as high as 100 kHz.

20. An object recognition computer system as set forth in claim 19 wherein said magnetic material permeability and saturation flux density properties are sufficiently high to detect only objects made from magnetic material having substantially similar permeability and saturation flux density properties.

References Cited

UNITED STATES PATENTS

| | | | |
|---|---|---|---|
| 2,931,023 | 3/1960 | Quade | 340—347 |
| 2,947,977 | 8/1960 | Bloch | 340—174 |
| 3,093,818 | 6/1963 | Hunter | 340—174 |
| 3,126,526 | 3/1964 | Wood | 340—174 |
| 3,149,316 | 9/1964 | Quade | 340—166 |

RAULFE B. ZACHE, Primary Examiner

U.S. Cl. X.R.

178—18; 340—146.3, 174, 324